(12) United States Patent
Schnur et al.

(10) Patent No.: US 9,573,774 B2
(45) Date of Patent: Feb. 21, 2017

(54) DEVICE FOR HANDLING PLATE-SHAPED OBJECTS

(71) Applicants: Hans Schnur, Ebersdorf (AT); Franz Albert Jansky, Sebersdorf (AT)

(72) Inventors: Hans Schnur, Ebersdorf (AT); Franz Albert Jansky, Sebersdorf (AT)

(73) Assignee: ROSENDAHL NEXTROM GMBH, Pischelsdorf (AT)

( * ) Notice: Subject to any disclaimer, the term of this patent is extended or adjusted under 35 U.S.C. 154(b) by 106 days.

(21) Appl. No.: 14/404,506

(22) PCT Filed: Jul. 18, 2013

(86) PCT No.: PCT/AT2013/000122
§ 371 (c)(1),
(2) Date: Nov. 28, 2014

(87) PCT Pub. No.: WO2014/036576
PCT Pub. Date: Mar. 13, 2014

(65) Prior Publication Data
US 2015/0147149 A1 May 28, 2015

(30) Foreign Application Priority Data
Sep. 10, 2012 (AT) .................................. A 987/2012

(51) Int. Cl.
*B65H 3/08* (2006.01)
*B65H 15/00* (2006.01)
(Continued)

(52) U.S. Cl.
CPC ............. *B65G 47/902* (2013.01); *B65G 47/24* (2013.01); *B65G 47/252* (2013.01); *B65G 47/914* (2013.01); *B65G 47/915* (2013.01)

(58) Field of Classification Search
CPC ....... B25J 19/0016; B25J 9/046; B25J 9/1045; B65H 3/0816; B31B 1/06; B31B 1/80
(Continued)

(56) References Cited

U.S. PATENT DOCUMENTS 2,119,585 A 6/1938 Knowlton
2,624,249 A * 1/1953 Baker ...................... B65H 3/38
264/571

(Continued)

FOREIGN PATENT DOCUMENTS

AT 241565 B 7/1965
AT 352198 B 9/1979
(Continued)

OTHER PUBLICATIONS

AT Search Report, dated Apr. 10, 2013, from corresponding AT application.
(Continued)

Primary Examiner — Gregory Adams
(74) Attorney, Agent, or Firm — Young & Thompson (57) ABSTRACT

A device for moving plate-shaped objects from a removal point, in which the objects are oriented substantially perpendicularly, to a delivery point, in which the objects are oriented substantially horizontally, includes a removal gripper moveable to and fro between the removal and the delivery points by a drive and which is rotated during the movement. The removal gripper is arranged on a lever so as to rotate with respect to the lever, which is pivoted to and fro by a drive. The removal gripper is connected to a shaft mounted rotatably in the lever and on which a wheel is fastened. An elongate, flexible element is placed over the wheel and fixed immovably in the direction of the longitudinal extension thereof. During pivoting of the lever, the wheel rolls on the elongate element. The movement of the
(Continued)

gripper is thus superimposed with a rotational movement of the removal gripper.

17 Claims, 7 Drawing Sheets

(51) Int. Cl.
| | | |
|---|---|---|
| *B65G 47/90* | (2006.01) | |
| *B65G 47/252* | (2006.01) | |
| *B65G 47/91* | (2006.01) | |
| *B65G 47/24* | (2006.01) | |

(58) Field of Classification Search
USPC ... 271/107, 12, 20, 31.1, 94, 99; 414/7, 732, 414/733, 737, 738, 744.7, 754, 759, 772, 774, 414/783, 791.3, 791.4, 793, 797; 493/316, 317; 72/405.01; 74/89.22, 99 R; 901/21, 40
See application file for complete search history.

(56) References Cited

U.S. PATENT DOCUMENTS

| | | | | | |
|---|---|---|---|---|---|
| 3,010,587 | A | * | 11/1961 | Hollinger | B21D 43/105 414/744.5 |
| 3,294,259 | A | | 12/1966 | Puhm | |
| 3,776,393 | A | * | 12/1973 | Bargstedt | B65G 61/00 414/733 |
| 4,079,845 | A | * | 3/1978 | Warren | B65B 23/08 414/416.07 |
| 4,350,330 | A | * | 9/1982 | Brown | B65H 1/26 271/12 |
| 4,360,187 | A | * | 11/1982 | Chapman | B66F 5/04 254/124 |
| 4,500,251 | A | * | 2/1985 | Kiryu | B25J 9/047 248/123.11 |
| 4,531,885 | A | * | 7/1985 | Molaug | B25J 9/046 414/7 |
| 4,605,393 | A | * | 8/1986 | Krieger | B31B 1/06 271/95 |
| 4,618,392 | A | * | 10/1986 | Uchimura | B65C 9/36 156/384 |
| 4,728,247 | A | * | 3/1988 | Nakashima | B25J 9/046 16/289 |
| 4,884,389 | A | * | 12/1989 | McGregor | B65B 43/14 141/114 |
| 5,207,114 | A | * | 5/1993 | Salisbury, Jr. | B25J 9/046 414/7 |
| 5,220,849 | A | * | 6/1993 | Lande | B05B 13/005 74/479.01 |
| 5,503,519 | A | | 4/1996 | Schwetz et al. | |
| 5,934,866 | A | | 8/1999 | Redden | |
| 7,736,121 | B2 | * | 6/2010 | Berger | B65H 3/085 271/105 |
| 2011/0150619 | A1 | * | 6/2011 | Nilsson | B65B 35/36 414/738 |

FOREIGN PATENT DOCUMENTS

| | | |
|---|---|---|
| AT | 379565 B | 1/1986 |
| AT | 387294 B | 12/1988 |
| AT | 389256 B | 11/1989 |
| AT | 398256 B | 11/1994 |
| EP | 1044151 A1 | 2/2002 |
| GB | 1522154 A | 8/1978 |
| GB | 1581764 A | 12/1980 |
| JP | 07242335 A | 9/1995 |
| WO | 9201619 A1 | 2/1992 |
| WO | 9839240 A1 | 9/1998 |
| WO | 9935068 A1 | 7/1999 |

OTHER PUBLICATIONS

International Search Report, dated Oct. 11, 2013, from corresponding OCT application.

* cited by examiner

DEVICE FOR HANDLING PLATE-SHAPED OBJECTS

The invention relates to a device for handling (moving) plate-shaped objects, in order to remove these from a stack of such plate-shaped objects and deposit them some distance from the stack—onto a conveying device (conveyer belt), for example—with the features of the preamble from Claim 1 (WO 1992/01619A).

In particular, the invention relates to a device for handling plate-shaped objects, with which plate-shaped objects (such as battery plates or storage-battery plates), arranged standing next to each other, can be removed from a stack gathered in an essentially horizontal magazine and deposited onto a conveyor belt. The device has a removal gripper that, for example, has at least one suction pad and is moveable to and fro between a "removal point", which gathers the forward-most plate of the stack, and a "delivery point", at which the object is detached from the removal gripper and which, for example, is assigned to a conveying device for plate-shaped objects.

BACKGROUND OF THE INVENTION

Devices that gather plate-shaped objects stacked on top of one another in a magazine are known from AT 241 565 B and AT 352 198 B. This superimposed arrangement of the plate-shaped objects in a stack results in substantial friction when the bottommost plate-shaped object is removed, especially in the case of larger stacks; this friction impedes separation of the plate-shaped objects. This is particularly true when the plate-shaped objects, gathered in a magazine, are plates or separators for storage batteries. For this reason it was previously proposed in AT 352 198 B that a clamping device, operable independent from the removal device, be provided at some distance from the removal point, in order to hold the weight of the stack during the withdrawal process.

Devices that move plate-shaped objects are known from GB 1,522,154 A and GB 1,581,764 A. These known devices require retractable restraints that are provided at the removal point. These restraints are problematic in that they must be synchronized with the movements of the removal gripper. Such restraints, in the form of retainer plates or retainer wings, are, however, necessary with the known devices, as they call for conveyor chains that seize the plate-shaped objects from below, in order to move them forward.

Devices for the removal of plate-shaped objects from stacks of such objects are further known from AT 387 294 B, U.S. Pat. No. 5,503,519 A, and EP 1 044 151 A.

Further devices for moving plate-shaped objects are known from AT 379 565 B and AT 389 256 B.

AT 398 256 B concerns a device for the removal of storage-battery plates from a stack and the depositing of the storage-battery plates on a conveyor. This device possesses two alternating grippers that each grasp a storage-battery plate. The grippers are moved alternatingly to and fro to a removal point, which gathers the first storage-battery plate of the stack, and to a delivery point, which is assigned to a conveyor. The grippers are mounted on levers, which swivel in the device. Each gripper is mounted on its lever such that it can rotate 360° about an axis of rotation aligned parallel to its pivot axis and can be turned in one direction with a drive. In order to improve the grasping of a storage-battery plate, the grippers stand still relative to the lever which is carrying them when said levers are located in their rotated position corresponding to the removal point.

WO 1992/01619 A discloses a device for moving plate-shaped objects, whereby the objects are oriented perpendicularly and are delivered horizontally. A removal gripper is movable to and fro and is twisted during movement. The removal gripper is arranged to twist on a lever opposite the lever, so that the lever can be pivoted to and fro by a drive. Furthermore, the removal gripper is associated with a rotating shaft.

JP 7242335 A and WO 1998/39240 A1 disclose devices for moving plate-shaped objects from a removal point, at which the removal gripper is moved only to and fro or the removal gripper is set on a revolving disc.

All known devices for handling plate-shaped objects, especially battery- or storage-battery plates, employ comparatively elaborate controls and lever configurations in order to move the removal gripper between the removal point and the delivery point, since during this motion the removal gripper must not only be moved to and fro between the positions mentioned, but must also pivot the plate-shaped objects in its grip by an angle on order of 90°.

A device for handling battery plates has become known as a component of a jacketing and stacking machine, type BMV10, from Rosendahl Maschinen GmbH in Pischelsdorf (Austria). With this known device the removal gripper is moved to and fro between the removal point and the delivery point by a sophisticated lever mechanism. In order to accomplish the movement between the removal point and the delivery point, a lever mechanism, which can pivot to and fro by means of a crank mechanism comprising a connecting rod and a crank, is assigned to the removal gripper. Since the removal gripper at the removal point must be pivoted at an angle on the order of 90° opposite the delivery point, the removal gripper is guided during the previously described to and fro movement via a link and in connection with a lever that has one fixed pivot point on the suspension and one on the removal gripper, pivoted at an angle on the order of 90°.

This device has proved its value per se; however, it has, with regards to its performance capability, run up against mechanical limits. As a result, there exists a need for a device of the type mentioned at the beginning; one which works faster and more reliably than the known devices.

SUMMARY OF THE INVENTION

The purpose of the invention is to propose a device of the type mentioned at the beginning, with which the drive for the combined to and fro movement of and pivoting of the removal gripper may be implemented by simple means.

This object is achieved according to the invention with a device that exhibits the features of Claim 1.

Preferred and advantageous configurations of the invention are the subjects of the subclaims.

The movement of the removal gripper between the removal point and the delivery point is combined with the turning of the removal gripper in a simple way by means of the wheel which is connected to the removal gripper and which, upon the pivoting of the lever, rolls along the elongated, flexible element. Synchronicity of the movements is ensured without sophisticated governance.

Because a drive, such as a crank assembly, is provided in the device according to the invention for swiveling the carrier for the removal gripper, the device according to the invention can be easily synchronized with the rest of the equipment—such as a facility for jacketing and stacking of battery plates—in which the device is provided.

If the removal gripper of the device according to the invention is equipped with at least one suction head (suction pad), which is supplied with negative pressure and by which the plate-shaped object is held as the removal gripper moves from the removal point to the delivery point, it is essential that the vacuum be reversed at the delivery point, where a plate-shaped object is detached (released) from the removal gripper and, for example, deposited on a conveyor belt. In a preferred embodiment of the invention, this takes place by means of a mechanical vacuum ventilation. This mechanical vacuum ventilation can, in a preferred embodiment, have an actuator button that strikes a stop fixed to the machine frame when the removal gripper is at the delivery point. It is preferred that the stop that the actuator button for the mechanical vacuum ventilation strikes be adjustable in its location.

The rotation of the previously-described removal gripper of the known device BMV10 is predetermined by the link and the motion of the crank assembly. With the plate-layer according to the invention, the rotation and the stroke of the crank assembly are predetermined by arrangement of the one shaft with respect to the other shaft, as well as by the different diameters of the drive elements (implemented preferably as chain sprockets). A movement of the removal gripper between the removal point and the delivery point, which is rounder than the removal gripper of the known device BMV10, takes place as a result of the differentiated design of the mechanics and by eliminating the motion link. By employing a kinematically optimized force triangle, higher clock speeds as well as a smaller required torque and protection of the mechanics are possible.

Because of the reduced and simplified mechanics and component layout of the device according to the invention, advantages in maintenance and upkeep result, as does better accessibility. A further advantage of the mechanics according to the invention is their adjustability.

In one embodiment of the invention, it may be envisaged that the lever has two plates (arranged at some distance apart; parallel to each other; connected to each other) and that the wheel which is attached to the shaft of the removal gripper, the wheel which is attached to the lever, and the disc are arranged between the plates.

BRIEF DESCRIPTION OF THE DRAWINGS

Further details and features of the invention emerge from the following description of preferred embodiment examples with reference to the attached drawings.

DETAILED DESCRIPTION OF THE PREFERRED EMBODIMENTS

The device 1 (shown schematically in FIGS. 1 and 2) for handling objects 5, especially for removing battery plates from stacks 3, has a removal gripper 2, which is able to move to and fro between a removal point (FIG. 1) corresponding to a stack 3 of plate-shaped objects 5 (especially their front ends) and a delivery point (FIG. 2) corresponding to a delivery-side end of a conveyor belt 4.

The removal gripper 2 is equipped with suction pads 30, which are supplied with negative pressure in order to receive plate-shaped objects 5, such as battery plates, from the stack 3 and hold them during relocation to the delivery-side end of the conveyor belt 4. When the removal gripper 2 is in the position corresponding to FIG. 2 (delivery point), the vacuum applied to the suction pads 30 is removed, so that the plate-shaped object 5 is released and deposited on the conveyor belt 4.

In order to be able to accomplish the movement between the removal point (FIG. 1) and the delivery point (FIG. 2), the removal gripper 2 is arranged on a lever 6, which can be pivoted to and fro in the direction of the double-arrow 10 by means of a crank assembly 7, comprising a connecting rod 8 and a crank 9.

Figure 1:
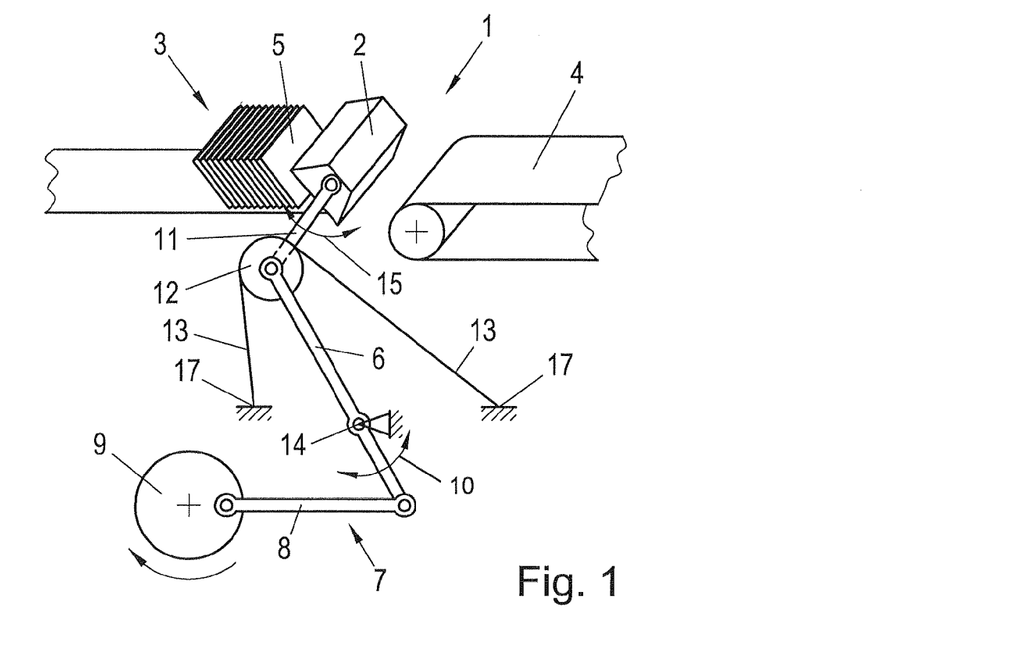
FIG. 1 shows: the basic principle, schematized, of a device according to the invention for handling plate-shaped objects in a first position (removal gripper at the removal point)
Figure 2:
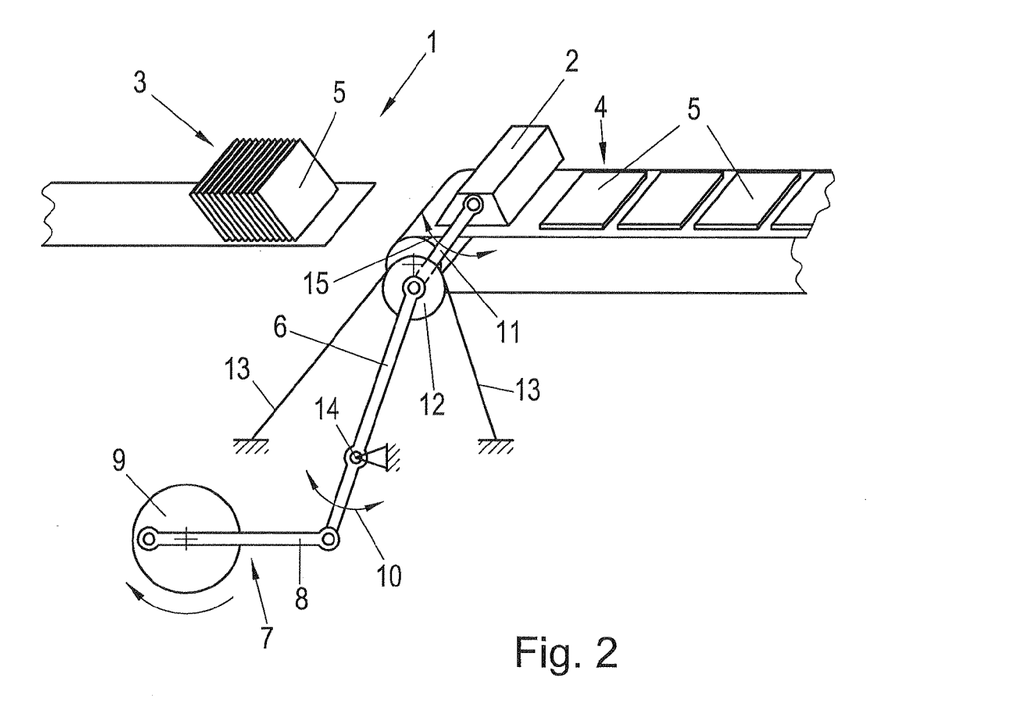
FIG. 2 shows: the device from FIG. 1 in a second position (removal gripper at the delivery point)

Because, as a comparison of FIGS. 1 and 2 shows, the removal gripper 2 must also be twisted (at an angle on the order of 90°) in its movement from the removal point (FIG. 1) to the delivery point (FIG. 2), the removal gripper 2 is mounted to rotate on the free end of the lever 6 via a shaft 11. Non-rotatably coupled with the shaft 11 is a wheel 12—for example a cogwheel—over which an elongated, flexible element 13 is laid; this element can be a chain, a drive belt, a v-belt, or something similar. The free ends of the element 13 are, in the arrangement of FIGS. 1 and 2, set at fixed frame points 17, so that the elongated element 13 cannot move in the direction of its longitudinal extension. Together with the wheel 12, the transmission for the swiveling movement of the removal gripper 2 is produced. The lever 6 is mounted to swivel in a machine-frame-fixed bearing 14. Because the element 13 is laid over the wheel 12, which is connected non-rotatably to the shaft 11 of the removal gripper 2, the removal gripper 2, as indicated by the double-arrow 15, is rotated during the swiveling movement of the lever 6 (double-arrow 10), because the wheel 12, when the lever 6 pivots, rolls along the elongated element 13, which does not move in the direction of its longitudinal extension. As the wheel 12 moves from the removal point to the delivery point, the wheel 12 and thereby the removal gripper 2 rotate from the rotation position that faces towards the stack 3 and is shown in FIG. 1 into the rotation position that faces towards the conveyor belt 4 and is shown in FIG. 2.

The exemplary embodiment of a device 1 according to the invention, shown in FIGS. 3 to 8, will be specified below.

The lever 6 has, in the embodiment shown in FIGS. 3 to 8, two approximately pear-shaped (not shown in FIGS. 3 and 4) plates 22 (FIGS. 5 and 6), which are mounted on a machine-frame-fixed mounting 21 via a shaft 20 that forms the bearing 14 of the lever 6.

Between the plates 22 of the lever 6 are strips 27, via which the plates 22 of the lever 6 are linked together with some distance between them. Arranged between the plates 22 of the lever 6 is a deflection disk 23, which sits non-rotatably on the shaft 20. Thus only the lever 6 is able to pivot with respect to the shaft 20.

The crank assembly 7 grips with its connecting rod 8 on the anterior of the two plates 22 of the lever 6 beneath the shaft 20 and beneath the deflection disc 23.

Figure 3:
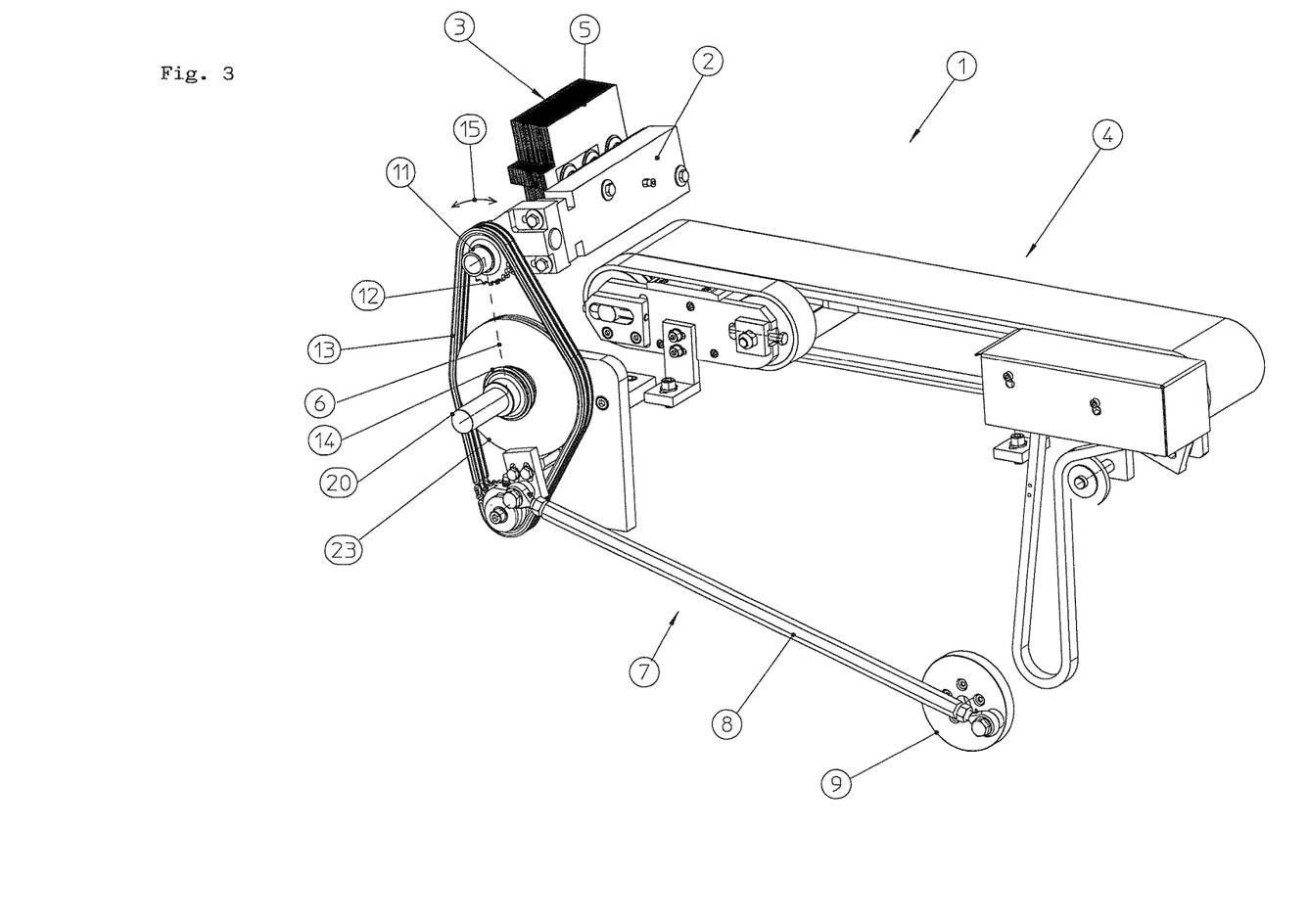
FIG. 3 shows: a practical embodiment of a device according to the invention in the position corresponding to FIG. 1 (removal gripper at the removal point)
Figure 4:
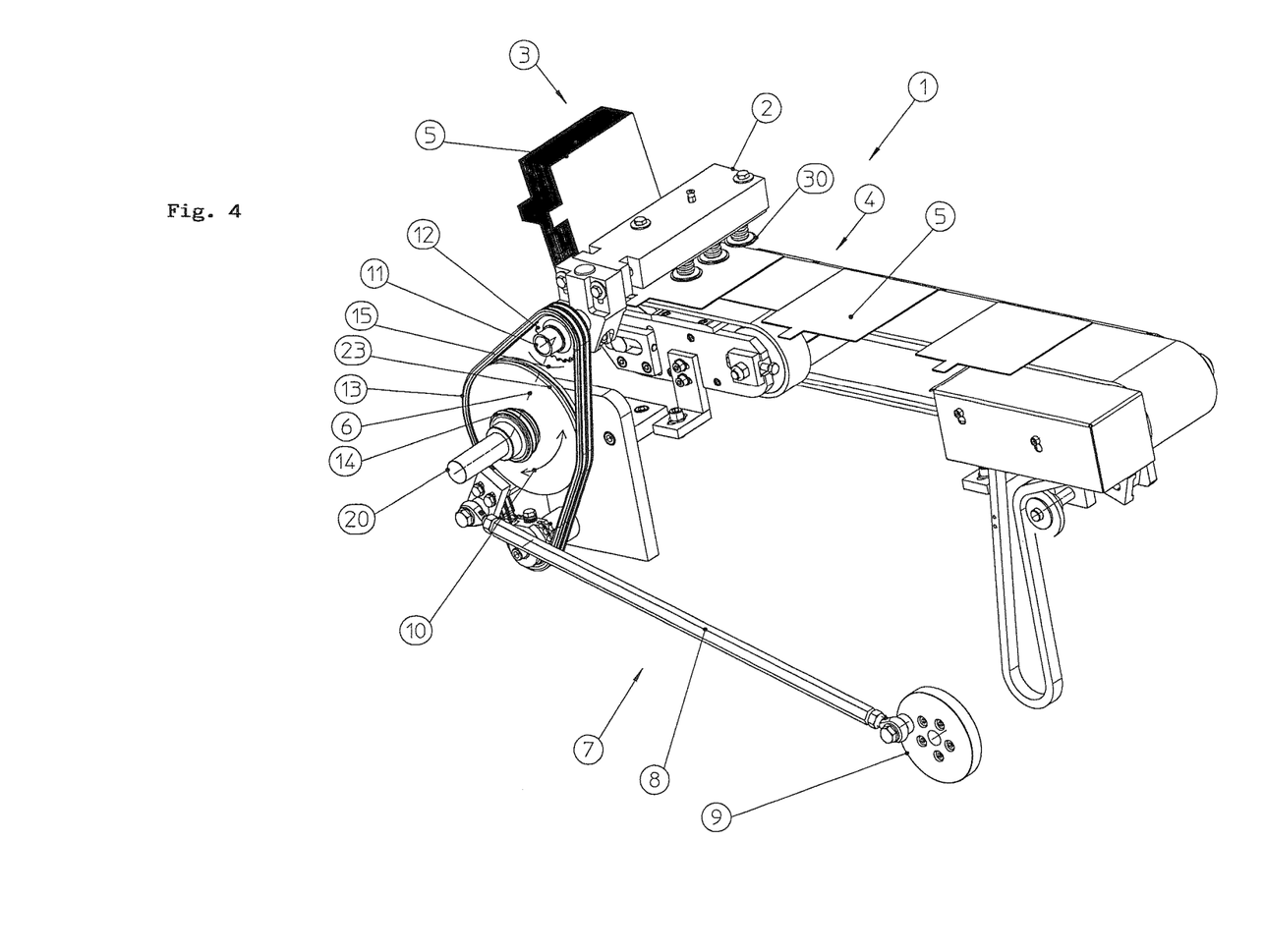
FIG. 4 shows: the device from FIG. 3 with removal gripper at the delivery point

The shaft 11 of the removal gripper 2 is mounted to rotate on the upper end of the lever 6 in FIGS. 3 and 4. The removal gripper 2 is attached to the shaft 11 via a clamping body 28. The wheel 12 (designed here as a cogwheel), over which the elongated element (designed here as an endless elongated member 13) is laid, sits on the shaft 11.

The runs of the endless elongated member 13 are laid over the deflection disc 23, which is mounted on the shaft 20 non-rotatably, i.e., it cannot twist. The areas of the runs of the endless elongated member 13 that are adjacent to the disc 23 thereby correspond to the points 17 of the arrangement of FIGS. 1 and 2, so that the endless elongated member 13 cannot move in the direction of its longitudinal extension. The endless elongated member 13 is furthermore laid over a cogwheel 25, which sits on a shaft 26 that is attached to the bracket 21. The cogwheel 25 is mounted non-rotatably on the shaft 26 and serves to tension the endless elongated member 13 as well as to secure it.

As FIGS. 3 to 8 show, the removal gripper 2 is equipped as a "vacuum gripper" with multiple suction pads 30 that can be exposed to negative pressure. The suction pads 30 of the removal gripper 2 are supplied with negative pressure through a vacuum connection 31, a channel in the shaft 11, and the clamping body 28.

Figure 7:
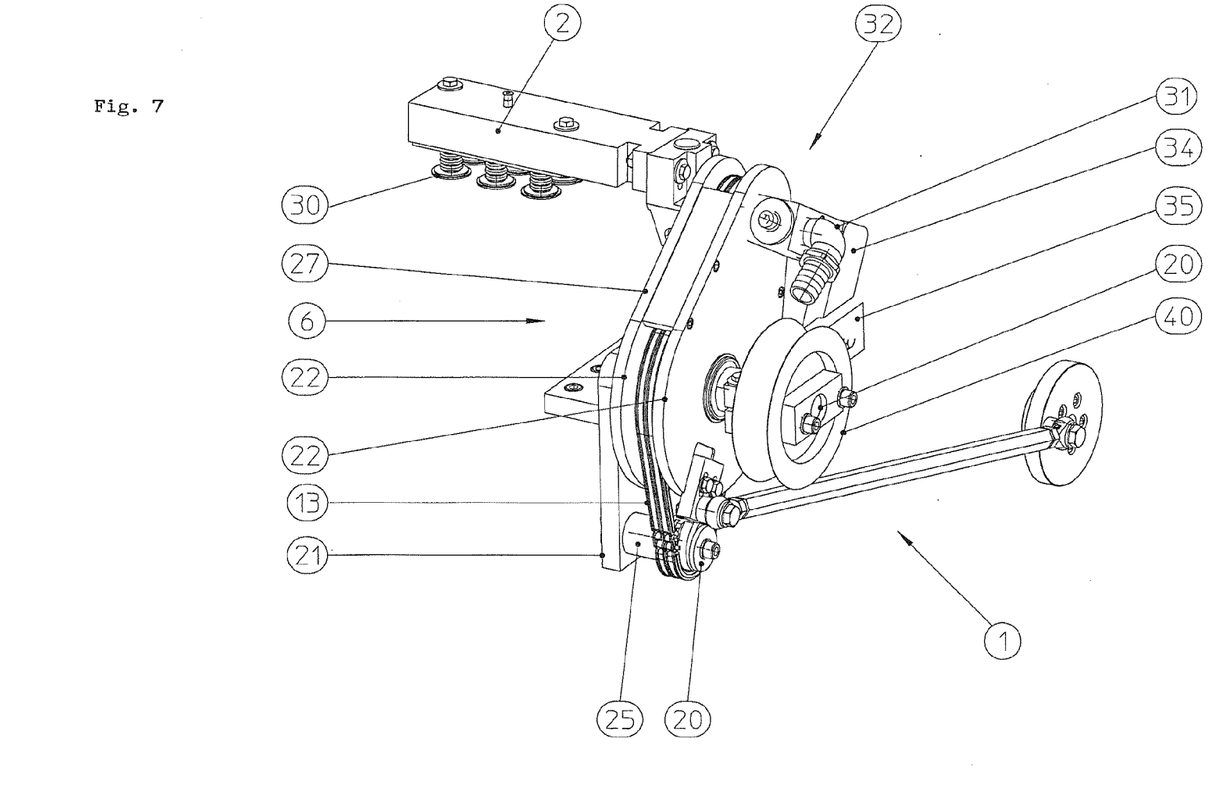
FIG. 7 shows: the device with removal gripper at the delivery point
Figure 8:
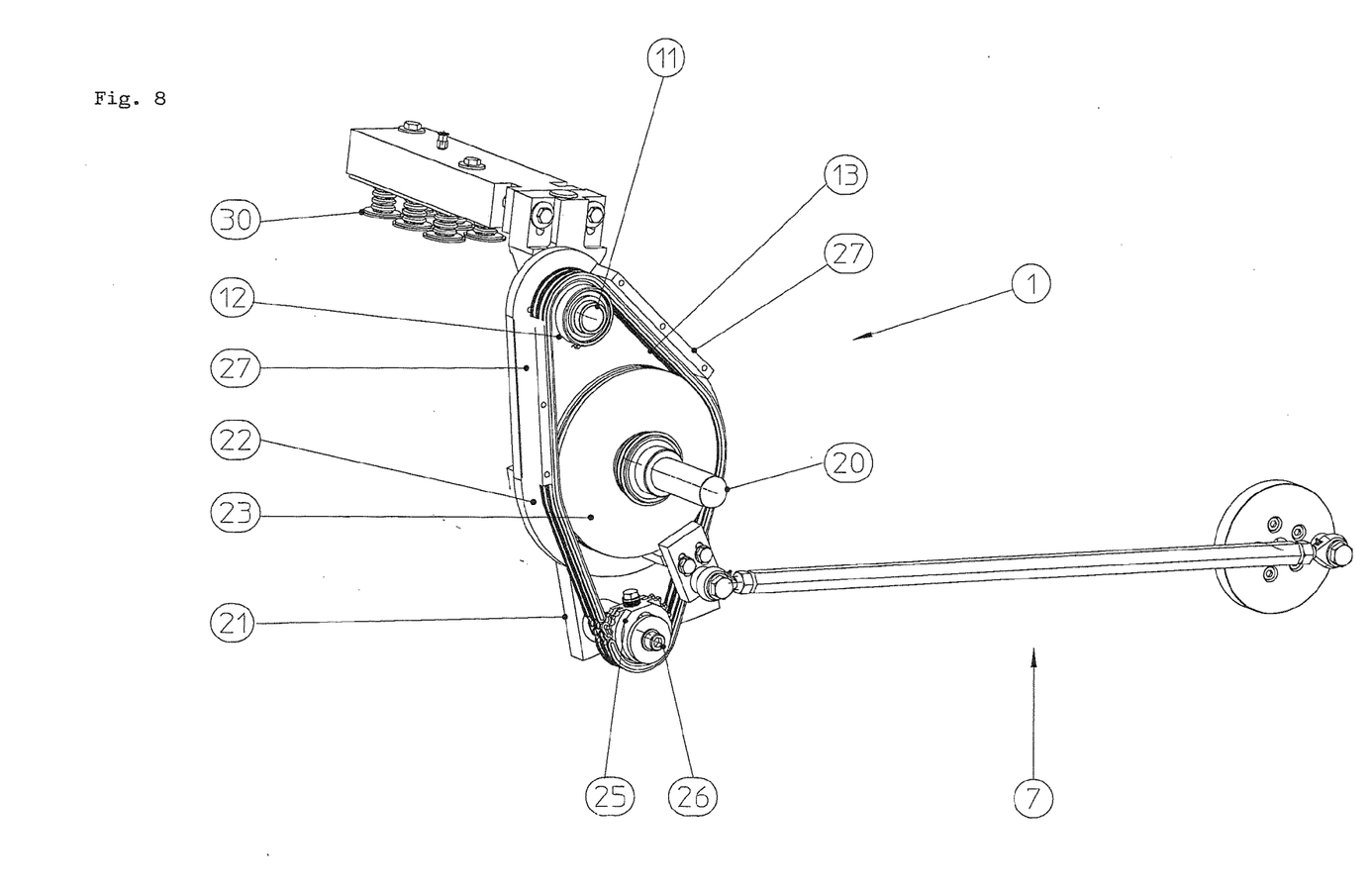
FIG. 8 shows: the device in the position corresponding to FIG. 7 in a different view

Because the suction pads 30 of the removal gripper 2 in the delivery point shown in FIGS. 7 and 8 must not be supplied with negative pressure, so that a plate-shaped object 5 (for example a battery plate) held by the removal gripper 2 can be deposited on the conveyor belt 4, a mechanical vacuum ventilation 32 is assigned to the vacuum connection 31. The vacuum ventilation 32 includes a plunger 33 as an actuator button, which, at the delivery point shown in FIGS. 7 and 8, strikes a stop 34 fixed to the machine frame and reverses the negative pressure applied to the suction pads 30, so that a plate-shaped object 5 is released and deposited on the conveyor belt 4. When the plunger 33 is activated upon striking the stop 34, a vent hole of the vacuum ventilation 32 is opened, so that the negative pressure is nullified as soon as the removal gripper 2 is at the delivery point.

The position of the stop 34, which activates the plunger 33 of the mechanical vacuum ventilation 32, is adjustable. The adjustability arises as a result of the stop 34, which the plunger 33 strikes, rotatable and moveable on a bracket 35, being determinable by means of a screw 37, which grips through a slot 36 in the bracket 35. Additionally, as, for example, FIG. 6 indicates, the bracket 35 is secured to the shaft 20 by means of clamping, so that it too is adjustable in position. In this manner, the moment at which the negative pressure is reversed through activation of the mechanical vacuum ventilation 32 can be adjusted.

A grooved pulley 40, which is attached to the shaft 20 by means of a bracket and two screws, is provided on the shaft 20, as FIGS. 5 to 8 show.

Figure 5:
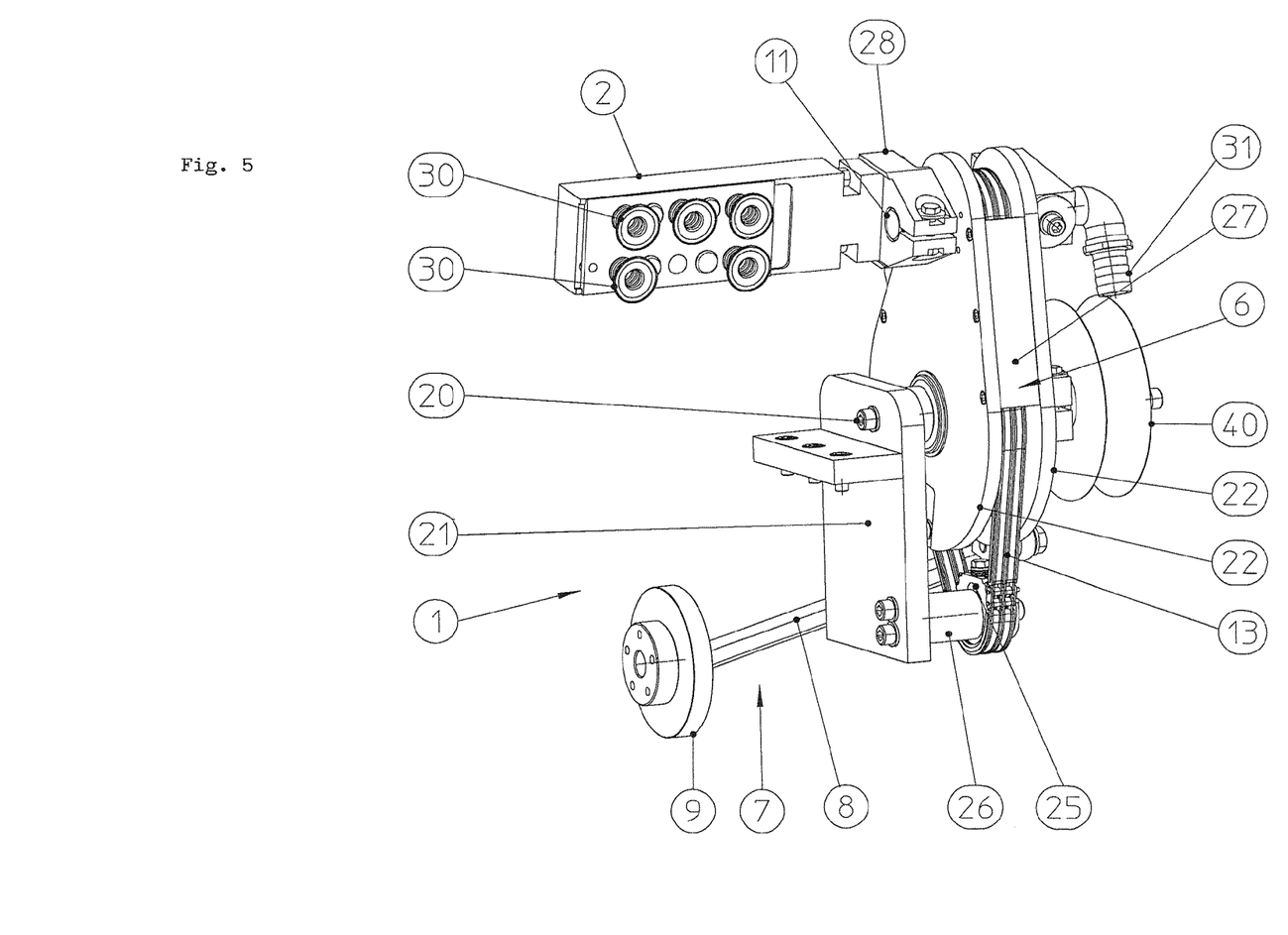
FIG. 5 shows: the device from FIGS. 3 and 4 with removal gripper at the removal point
Figure 6:
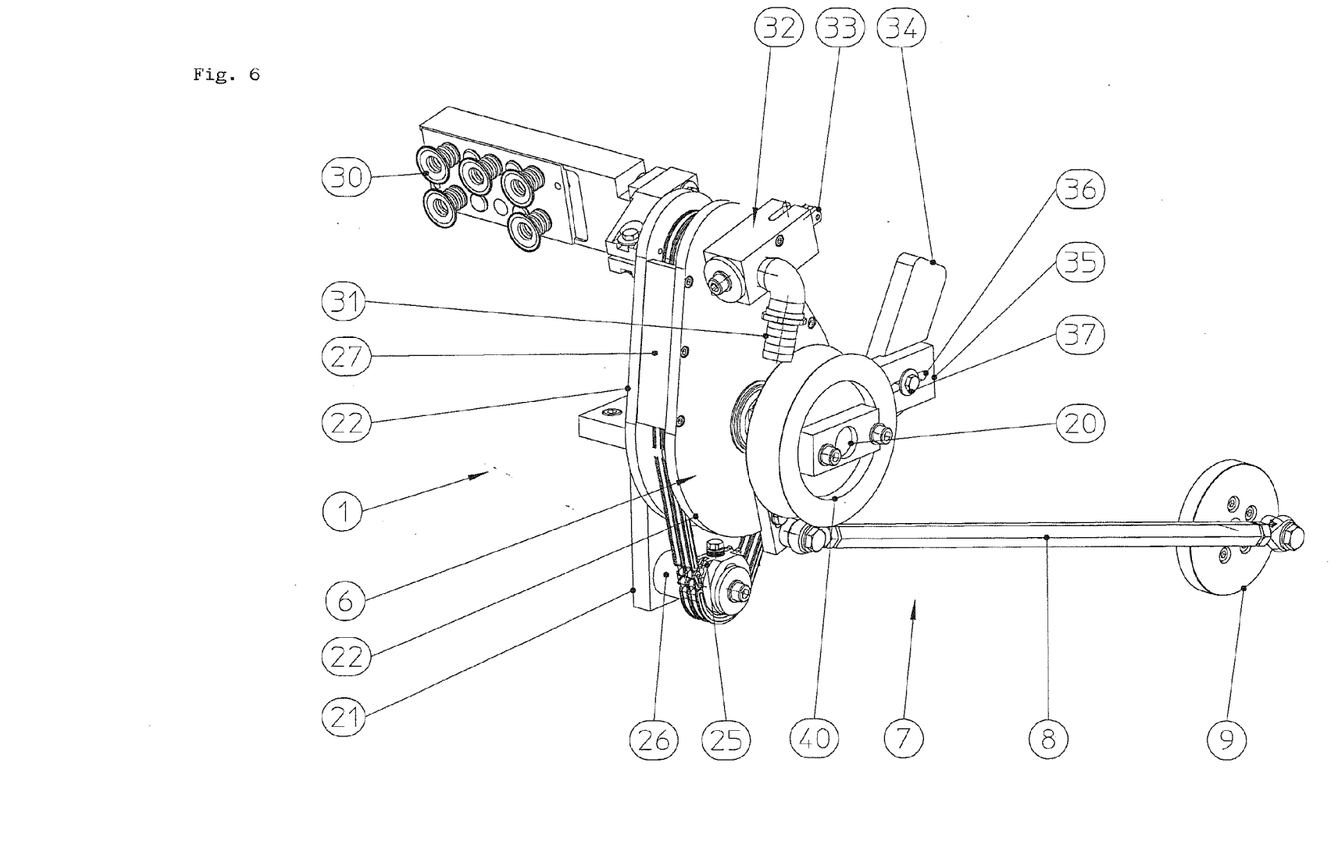
FIG. 6 shows: the device in the position corresponding to FIG. 5 in a different view

Through activation (pivoting) of the lever 6 by means of the crank assembly 7, the removal gripper 2 is moved from the removal point, shown in FIGS. 5 and 6, into the delivery point, shown in FIGS. 7 and 8, whereby it, actuated by the infinite endless elongated member 13, which is laid over the cogwheel 12 and the deflection disk 23, and along which the cogwheel 12 rolls during the pivoting of the lever 6, simultaneously executes a rotational movement about its axis defined by the shaft 11, so that a plate-shaped object 5, especially a battery plate, which is oriented essentially vertically in the stack 3, is swiveled at an angle of about 90° and can be deposited on an essentially horizontally oriented conveyor belt 4.

In summary, an example of implementation of the invention can be described as follows:

A device for moving plate-shaped objects 5 (battery plates) from a removal point at which the objects 5 are oriented essentially vertically, into a delivery point, at which the objects 5 are oriented essentially horizontally, has a removal gripper 2, which can be moved to and fro by a drive between the removal point and the delivery point and which is rotated during this movement. The removal gripper 2 is arranged to rotate on a lever 6 with respect to the lever 6. The lever 6 is pivoted to and fro by a drive 7. The removal gripper 2 is connected to a shaft 11 that is mounted to rotate in the lever 6 and to which a wheel 12 is attached. Laid over the wheel 12 is an elongated, flexible element 13, which is immovably fixed in the direction of its longitudinal extension. During the pivoting of the lever 6, the wheel 12 rolls along the elongated element 13. In this manner, the movement of the removal gripper 2 to and fro is overlaid by a rotational movement of the removal gripper 2.

The invention claimed is:

1. A device for moving plate-shaped objects (5) from a removal point, in which the objects (5) are oriented essentially vertically, to a delivery point, in which the objects (5) are oriented essentially horizontally, comprising:
    a removal gripper (2), which carries out a movement to and fro between the removal point and the delivery point by a drive and which rotates during the movement,
    the removal gripper (2) being arranged on a lever (6) such that the removal gripper (2) twists with respect to the lever (6), as a result of the lever (6) being pivoted to and fro by a drive (7),
    wherein the removal gripper (2) is connected to a shaft (11) which is mounted to rotate in the lever (6),
    wherein a wheel (12) is fastened to the shaft (11),
    wherein an elongated, flexible element (13) is mounted upon a circumferential surface of the wheel (12),
    wherein the flexible element (13) is fixed immovably in a direction of the longitudinal extension thereof,
    wherein the flexible element (13) is endless,
    wherein the endless element (13) is placed over the wheel (12) on the shaft (11) of the removal gripper (2) and over a wheel (25) that is fastened on the lever (6) in the area of the end which lies opposite the shaft (11) of the removal gripper (2),
    wherein the runs of the endless element (13) between the wheel (12), which is attached to the shaft (11) of the removal gripper (2), and the wheel (25), which is attached to the lever (6), rest against a deflection disc (23), and
    wherein the lever (6) pivots with respect to the stationary disc (23).

2. The device according to claim 1, wherein the endless element (13) is one of a cam belt or a roller chain.

3. The device according to claim 2, wherein the wheels (12, 25) are cogged.

4. The device according to claim 2,
    wherein the runs of the endless element (13) between the wheel (12), which is attached to the shaft (11) of the removal gripper (2), and the wheel (25), which is attached to the lever (6), rest against a deflection disc (23), and wherein the lever (6) pivots with respect to the stationary disc (23).

5. The device according to claim 1, wherein the deflection disc (23) is arranged coaxially to the pivot axis (20) of the lever (6).

6. The device according to claim 5, wherein the diameter of the deflection disc (23) is greater than the diameter of the wheel (12) on the shaft (11) of the removal gripper (2) and the wheel (25) attached to the lever (6).

7. The device according to claim 1, wherein the diameter of the deflection disc (23) is greater than the diameter of the wheel (12) on the shaft (11) of the removal gripper (2) and the wheel (25) attached to the lever (6).

8. The device according to claim 1, wherein the drive (7) for pivoting the lever (6) is a crank assembly.

9. The device according to claim 8, wherein the pivot axis (14) of the lever (6) is arranged between the shaft (11) of the removal gripper (2) and the end of the lever that the drive (7) grasps.

10. The device according to claim 9, wherein the connecting rod (8) of the crank assembly (7) grasps the lever (6) in the region of the end of the lever (6) that is opposite the shaft (11) of the removal gripper (2).

11. The device according to claim 8, wherein the connecting rod (8) of the crank assembly (7) grasps the lever (6) in the region of the end of the lever (6) that is opposite the shaft (11) of the removal gripper (2).

12. The device according to claim 1, wherein at least one suction pad (30), which is supplied with negative pressure, is arranged on the removal gripper (2).

13. The device according to claim 12, wherein the suction pad (30) is supplied with negative pressure via a channel that is provided in the shaft (11) of the removal gripper (2).

14. The device according to claim 13, wherein a vacuum ventilation (32), which, at the delivery point, reverses the negative pressure applied to the suction pads (30), is assigned to the channel.

15. The device according to claim 12, wherein a vacuum ventilation (32), which, at the delivery point, reverses the negative pressure applied to the suction pads (30), is assigned to the channel.

16. The device according to claim 15, wherein the vacuum ventilation (32) has an actuation plunger (33) that strikes a stop (34) at the delivery point of the removal gripper (2).

17. The device according to claim 16, wherein the position of the stop (34) is adjustable.

* * * * *